United States Patent
Komura et al.

(10) Patent No.: US 6,216,232 B1
(45) Date of Patent: *Apr. 10, 2001

(54) DATA PROCESSING SYSTEM AND METHOD CAPABLE OF HALTING SUPPLY OF CLOCK SIGNAL WITHOUT DELAY

(75) Inventors: Takashi Komura; Teruyuki Itoh, both of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,250

(22) Filed: Nov. 2, 1998

(30) Foreign Application Priority Data

May 14, 1998 (JP) .................................... 10-132468

(51) Int. Cl.[7] ................................. G06F 1/26; G06F 1/04
(52) U.S. Cl. ........................... 713/300; 713/601; 712/43; 712/229
(58) Field of Search .................. 713/300–340, 713/600–601; 712/43, 229

(56) References Cited

U.S. PATENT DOCUMENTS

| | | | |
|---|---|---|---|
| 4,463,440 | * 7/1984 | Nishiura et al. | 713/400 |
| 4,615,005 | * 9/1986 | Maejima et al. | 713/601 |
| 4,758,945 | * 7/1988 | Remedi | 713/322 |
| 5,038,280 | * 8/1991 | Watanabe et al. | 711/215 |
| 5,218,712 | * 6/1993 | Cutler et al. | 710/261 |
| 5,261,063 | * 11/1993 | Kohn et al. | 712/229 |
| 5,475,856 | * 12/1995 | Kogge | 712/20 |

FOREIGN PATENT DOCUMENTS 5-224966  9/1993 (JP) ............................. G06F/11/00

* cited by examiner

Primary Examiner—Sumati Lefkowitz
(74) Attorney, Agent, or Firm—Burns, Doane, Swecker & Mathis, LLP

(57) ABSTRACT

A data processing system which executes pipeline processing that decodes a subsequent instruction in an execute phase of a current instruction in response to a clock signal. The data processing system includes a CPU and a mode management block. The CPU supplies an address bus with at least one predetermined address in an execute phase of a clock supply stop instruction. The mode management block produces a clock stop signal if the predetermined address agrees with a self-address assigned to the management block in advance, thereby halting the supply of the clock signal. This makes it possible to solve a problem of a conventional data processing system in that it executes the instruction next to the clock supply stop instruction in spite of execution of the clock supply stop instruction because the clock stop signal is actually output when the clock supply stop instruction shifts from the execute phase to the write back phase, in which case the next instruction proceeds in the execute phase.

18 Claims, 15 Drawing Sheets

DATA PROCESSING SYSTEM AND METHOD CAPABLE OF HALTING SUPPLY OF CLOCK SIGNAL WITHOUT DELAY

BACKGROUND OF THE INVENTION

1. Field of the Invention

The present invention relates to a data processing system and data processing method capable of halting the supply of a clock signal to individual blocks immediately when a clock supply stop instruction is executed.

2. Description of Related Art

FIG. 17 is a block diagram showing a configuration of a conventional data processing system disclosed in Japanese patent application laid-open No. 5-197627/1993, for example. In FIG. 17, the reference numeral 1 designates a CPU for carrying out pipeline processing that decodes the next instruction while executing a current instruction; 2 designates a memory for storing programs to be executed by the CPU 1; 3 and 4 each designate peripheral equipment for executing predetermined operations; and 5 designates a clock power manager for controlling supply of the clock signal to individual blocks such as CPU 1, memory 2 and peripheral equipment 3 and 4.

FIG. 18 is a block diagram showing a configuration of the clock power manager 5, in which the reference numeral 6 designates an identity decision block that outputs, if the address placed on the address bus by the CPU 1 agrees with the self-address of the identity decision block 6 when the CPU 1 outputs a write enable signal, an operation enable command for enabling writing of data placed on the data bus by the CPU 1. The reference numeral 7 designates a mode transition register that stores, in response to the operation enable command from the identity decision block 6, the data placed on the data bus by the CPU 1; 8 designates an identity decision block that outputs, in response to the operation enable command from the identity decision block 6, a clock stop signal if the data stored in the mode transition register 7 instructs to halt the clock supply; and 9 designates a clock halt block that suspends, in response to the clock stop signal from the identity decision block 8, the supply of the clock signal to respective blocks.

Next, the operation of the conventional data processing system will be described.

First, the CPU 1 carries out the pipeline processing that decodes subsequent instructions while executing the current instruction as illustrated in FIG. 19.

More specifically, assume that the operation of the CPU 1 involved in executing an instruction is partitioned into the following four phases, for example: an instruction fetch phase IF that fetches an instruction from a program in the memory 2; an instruction decode phase ID that decodes the instruction; an execute phase EX that performs in accordance with the instruction a predetermined operation by acquiring data from the memory or registers; and a write back phase WB that writes an execution result back to the memory 2 or the mode transition register 7. In that case, when the instruction 1 is in the write back phase WB, for example, the instruction 2 next to the instruction 1 is in the execute phase EX, and the instruction 3 next to the instruction 2 is in the instruction decode phase ID.

Now, the case will be described where the CPU 1 executes the clock stop instruction.

First, fetching the instruction from the program in the memory 2 in the instruction fetch phase IF, the CPU 1 decodes the instruction in the instruction decode phase ID, and recognizes that the instruction is the clock stop instruction.

Subsequently, the CPU 1 supplies, in the execute phase EX, the data bus with data instructing to halt the supply of the clock signal, the address bus with the address of the identity decision block 6, and the control signal line with a write enable signal.

In response to that, the identity decision block 6 decides, in the execute phase EX, whether or not the address on the address bus agrees with the self-address of the identity decision block 6, and outputs the operation enable command that allows writing of data if they agree.

Receiving the operation enable command from the identity decision block 6, the mode transition register 7 shifts, in the write back phase WB, into a data write enabled state, and writes the data placed on the data bus by the CPU 1. Note that when the clock stop instruction is in the write back phase WB, the next instruction is in the execute phase EX as shown in FIG. 20.

Thus, when the mode transition register 7 writes the data in response to the operation enable command supplied from the identity decision block 6, and if the data stored in the mode transition register 7 instructs to halt the supply of the clock signal, the identity decision block 8 outputs the clock stop signal. Receiving the clock stop signal from the identity decision block 8, the clock halt block 9 suspends the supply of the clock signal to the individual blocks, which causes these blocks such as the CPU 1, memory 2, peripheral equipment 3 and 4 to halt their operations.

With the foregoing arrangement, the conventional data processing system has a problem of having executed the instruction next to the clock stop instruction, when the CPU 1 executed the clock stop instruction. This is because although the supply of the clock signal to the blocks is suspended when the CPU 1 executes the clock stop instruction, the clock power manager 5 supplies the clock halt block 9 with the clock stop signal when the clock stop instruction shifts into the write back phase WB, in which case the next instruction has already shifted into the execute phase EX.

Incidentally, Japanese patent application laid-open No. 2-249199/1990 discloses a technique for comparing the address data to prevent erroneous writing of an involatile memory, and Japanese patent application laid-open No. 5-224966/1993 discloses a technique for preventing erroneous operation by writing "1" into a flag at a time when executing the stop operation. These techniques, however, do not consider the pipeline processing, and hence cannot prevent the instruction next to the clock stop instruction from being executed because the next instruction proceeds to the execute phase EX while the clock stop instruction is in the write back phase WB.

SUMMARY OF THE INVENTION

The present invention is implemented to solve the foregoing problem. It is therefore an object of the present invention to provide a data processing system and data processing method capable of halting the supply of the clock signal before the CPU executes the next instruction when it executes the clock stop instruction.

According to a first aspect of the present invention, there is provided a data processing system which executes pipeline processing that decodes a subsequent instruction in an execute phase of a current instruction in response to a clock signal, the data processing system comprising: a CPU that supplies an address bus with at least one predetermined address in an execute phase of an operation mode switching instruction; and mode management means for producing an operation mode switching signal if the predetermined address placed on the address bus by the CPU agrees with a self-address assigned to the management means in advance.

Here, the data processing system may further comprise halt means for suspending supply of the clock signal in response to a clock stop signal for halting supply of the clock signal, the CPU may execute a clock stop instruction as the operation mode switching instruction, and supplies, in an execute phase of the clock stop instruction, the address bus with the predetermined address, and the mode management means may comprise stop signal generating means for generating the clock stop signal as the operation mode switching signal if the predetermined address placed on the address bus by the CPU agrees with a self-address assigned in advance to the stop signal generating means as the self-address of the mode management means.

The data processing system may further comprise halt means for suspending supply of the clock signal in response to a clock stop signal for halting supply of the clock signal, wherein the CPU may execute a clock stop instruction as the operation mode switching instruction, and supplies, in an execute phase of the clock stop instruction, the address bus with a plurality of predetermined addresses in sequence, and wherein the mode management means may comprise: enable signal generating means for generating, in the execute phase of the clock stop instruction, an operation enable signal if a first address of the predetermined addresses agrees with a self-address assigned to the enable signal generating means in advance; and stop signal generating means for generating, in the execute phase of the clock stop instruction, the clock stop signal as the operation mode switching signal in response to the operation enable signal if a second address of the predetermined addresses agrees with a self-address assigned to the stop signal generating means in advance as the self-address of the mode management means.

The CPU may execute a clock stop instruction as the operation mode switching instruction, and supply, in an execute phase of the clock stop instruction, the address bus with a plurality of predetermined addresses in sequence, the management means may comprise stop signal generating means for generating a clock stop signal for halting supply of the clock signal, if one of the plurality of predetermined addresses placed on the address bus by the CPU agrees with a self-address assigned to the stop signal generating means in advance, and the data processing system may further comprise halt means for suspending supply of the clock signal in response to the clock stop signal.

The CPU may supply, in the execute phase of the operation mode switching instruction, the address bus with a plurality of predetermined addresses in sequence, and a data bus with data indicative of an operation mode after mode switching, the mode management means may comprise: storing means for storing in a register the data placed on the data bus by the CPU, if a first address of the plurality of predetermined addresses placed on the address bus by the CPU agrees with a self-address assigned to the storing means; transfer means for reading the data stored in the register, and for sending the data if a second address of the plurality of predetermined addresses placed on the address bus by the CPU agrees with a self-address assigned to the transfer means; and mode switching means for producing the operation mode switching signal corresponding to the data sent from the transfer means.

The data processing system may further comprise halt means for suspending the clock signal in response to the operation mode switching signal output from the mode switching means, if the operation mode switching signal instructs halt of the supply of the clock signal. The data processing system may further comprise delay means for delaying a bus end signal supplied from the stop signal generating means to the CPU to notify the CPU of a completion of the clock stop signal.

The data processing system may further comprise delay means for delaying a bus end signal supplied from the transfer means to the CPU to notify the CPU of a completion of the operation mode switching signal, if the mode switching means outputs the operation mode switching signal instructing halt of supply of the clock signal.

According to a second aspect of the present invention, there is provided a data processing method which executes pipeline processing that decodes a subsequent instruction in an execute phase of a current instruction in response to a clock signal, the data processing method comprising the steps of: (a) supplying, in an execute phase of an operation mode switching instruction, an address bus with at least one predetermined address; and (b) producing an operation mode switching signal if the predetermined address placed on the address bus agrees with a preset address.

Here, the step (a) may execute a clock stop instruction as the operation mode switching instruction, and supply, in an execute phase of the clock stop instruction, the address bus with the predetermined address, the step (b) may generate a clock stop signal for halting supply of the clock signal, as the operation mode switching signal, if the predetermined address placed on the address bus agrees with the preset address, and the data processing method may further comprise the step of suspending supply of the clock signal in response to the clock stop signal.

The step (a) may execute a clock stop instruction as the operation mode switching instruction, and supply, in an execute phase of the clock stop instruction, the address bus with a plurality of predetermined addresses in sequence, the step (b) may decide, in the execute phase of the clock stop instruction, whether a first address of the predetermined addresses agrees with a first preset address, and whether a second address of the predetermined addresses agrees with a second preset address, and generate, if both decisions are positive, a clock stop signal to halt supply of the clock signal in response to the clock stop signal.

The step (a) may execute a clock stop instruction as the operation mode switching instruction, and supply, in an execute phase of the clock stop instruction, the address bus with a plurality of predetermined addresses in sequence, the step (b) may generate a clock stop signal for halting supply of the clock signal, if one of the plurality of predetermined addresses placed on the address bus agrees with a preset address, and the data processing method may further comprise the step of suspending supply of the clock signal in response to the clock stop signal.

The step (a) may supply, in the execute phase of the operation mode switching instruction, the address bus with a plurality of predetermined addresses in sequence, and a data bus with data indicative of an operation mode after mode switching, and the step (b) may comprise the substeps of: storing in a register the data placed on the data bus, if a first address of the plurality of predetermined addresses placed on the address bus agrees with a first preset address; and producing the operation mode switching signal corresponding to the data stored in the register, if a second address of the plurality of predetermined addresses placed on the address bus agrees with a second preset address.

The data processing method may further comprise the step of suspending the clock signal in response to the operation mode switching signal, if the operation mode switching signal instructs halt of the supply of the clock signal.

The data processing method may further comprise the step of delaying a bus end signal which notifies that the clock stop signal is completed.

The data processing method may further comprise the step of delaying a bus end signal which notifies that the operation mode switching signal is completed, if the operation mode switching signal is output which instructs halt of supply of the clock signal.

DETAILED DESCRIPTION OF THE PREFERRED EMBODIMENTS

The invention will now be described with reference to the accompanying drawings.

Embodiment 1

Figure 1:
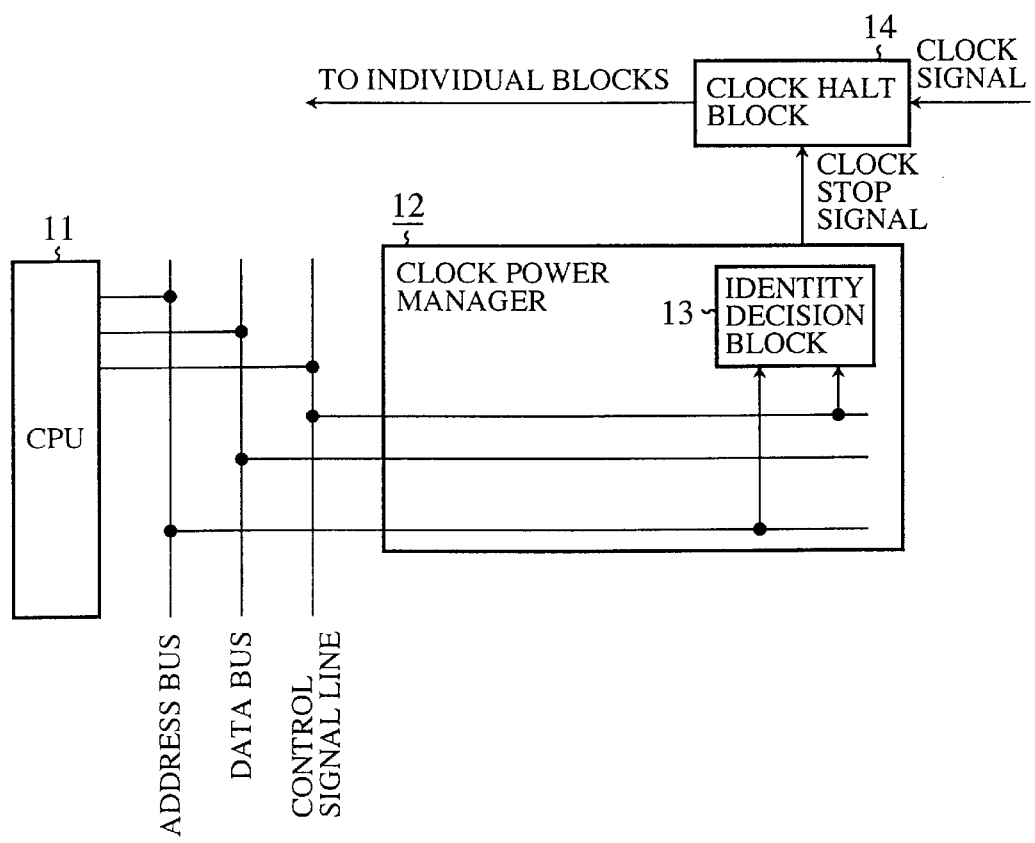
FIG. 1 is a block diagram showing a configuration of an embodiment 1 of a data processing system in accordance with the present invention.

FIG. 1 is a block diagram showing a configuration of an embodiment 1 of a data processing system in accordance with the present invention. In FIG. 1, the reference numeral 11 designates a CPU which carries out the pipeline processing that decodes the subsequent instructions while executing the current instruction, and which supplies, when executing the clock supply stop instruction, the address bus with the address of an identity decision block 13; 12 designates a clock power manager for controlling the supply of the clock signal to respective blocks under the control of the CPU 11; 13 designates the identity decision block 13 (stop signal generating means) that produces, if its self-address agrees with the address placed on the address bus by the CPU 11, a clock stop signal; and 14 designates a clock halt block that halts the supply of the clock signal to the respective blocks in response to the clock stop signal output from the identity decision block 13.

Figure 4:
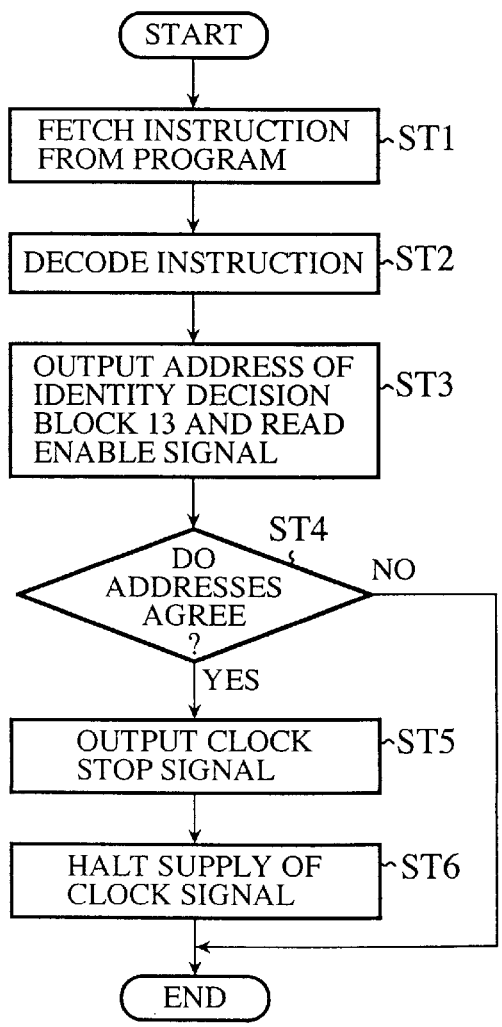
FIG. 4 is a flowchart illustrating a processing in the embodiment 1.

Next, the operation of the present embodiment 1 will be described with reference to the flowchart of FIG. 4 illustrating a data processing of the present embodiment 1.

Figure 19:
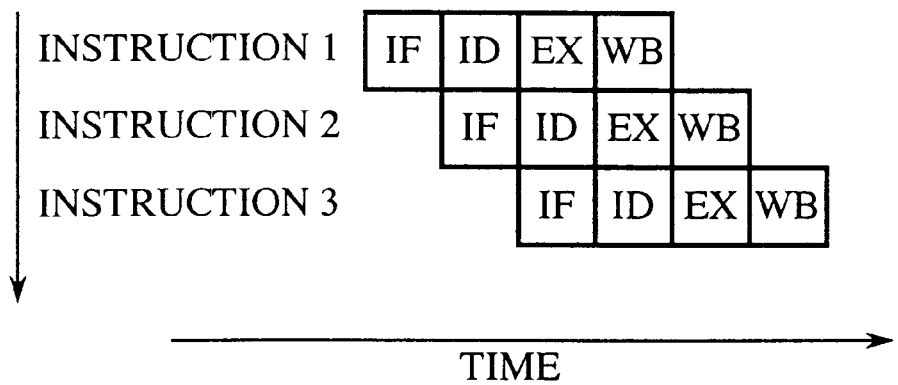
FIG. 19 is a state transition diagram illustrating phase transition in pipeline processing.
Figure 20:
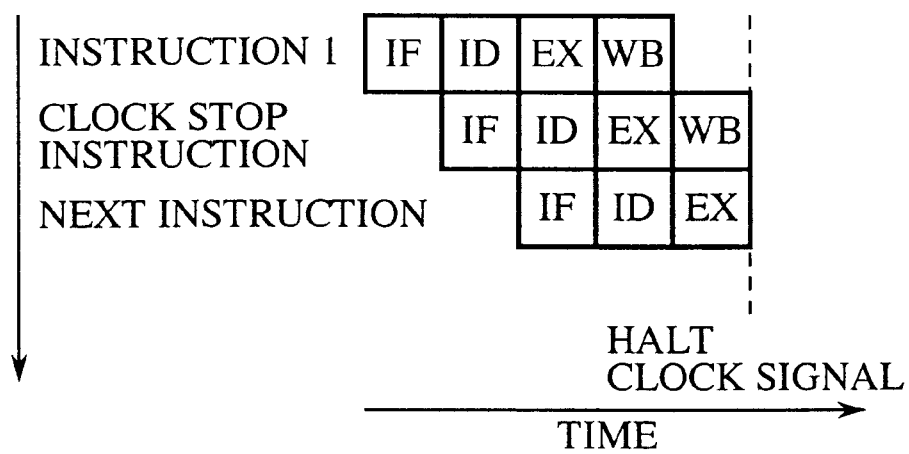
FIG. 20 is a state transition diagram illustrating phase transition while the clock stop instruction is being executed.

First, the CPU 11 carries out the pipeline processing that decodes the subsequent instruction while executing the current instruction as illustrated in FIG. 19.

Figure 17:
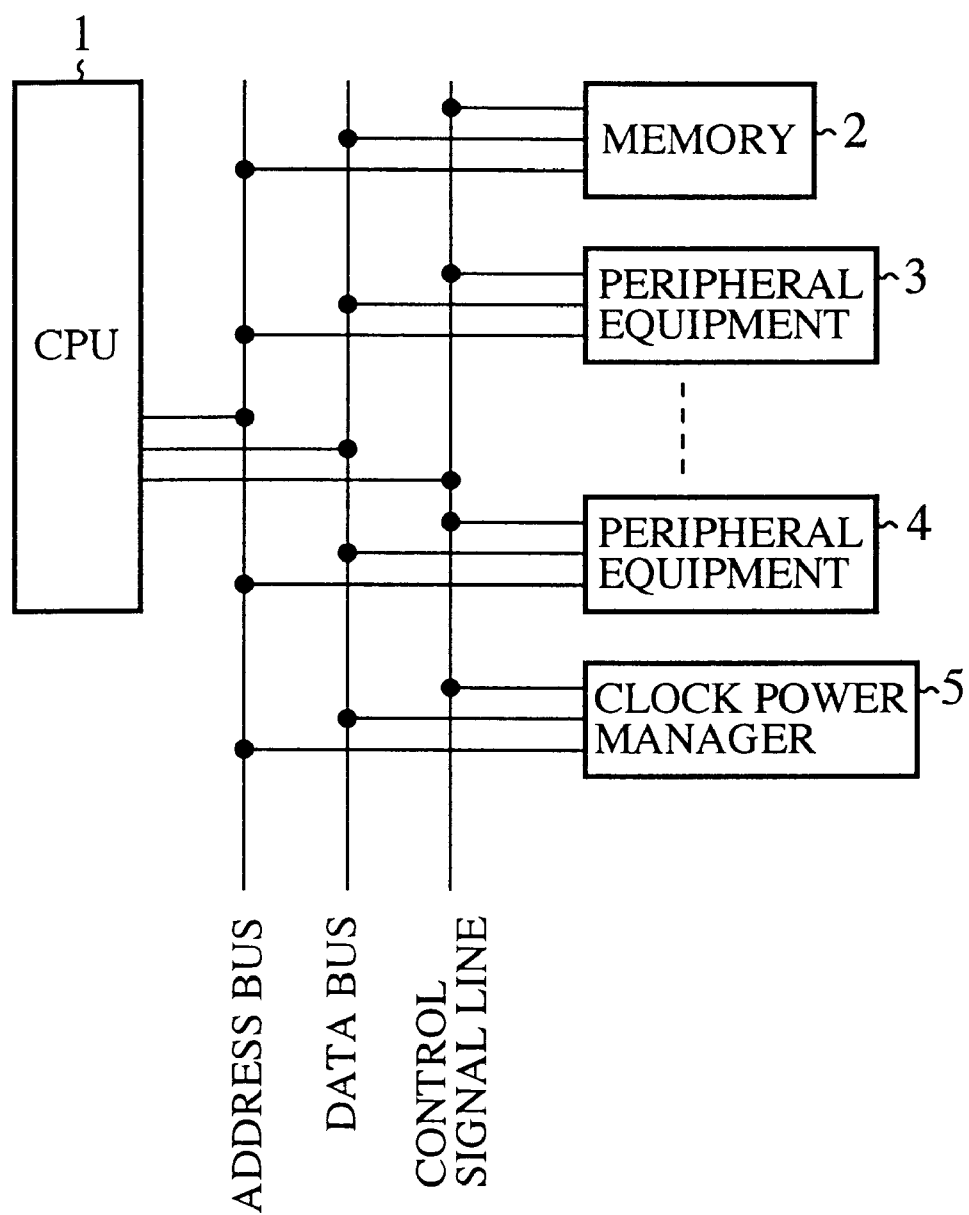
FIG. 17 is a block diagram showing a configuration of a conventional data processing system.
Figure 18:
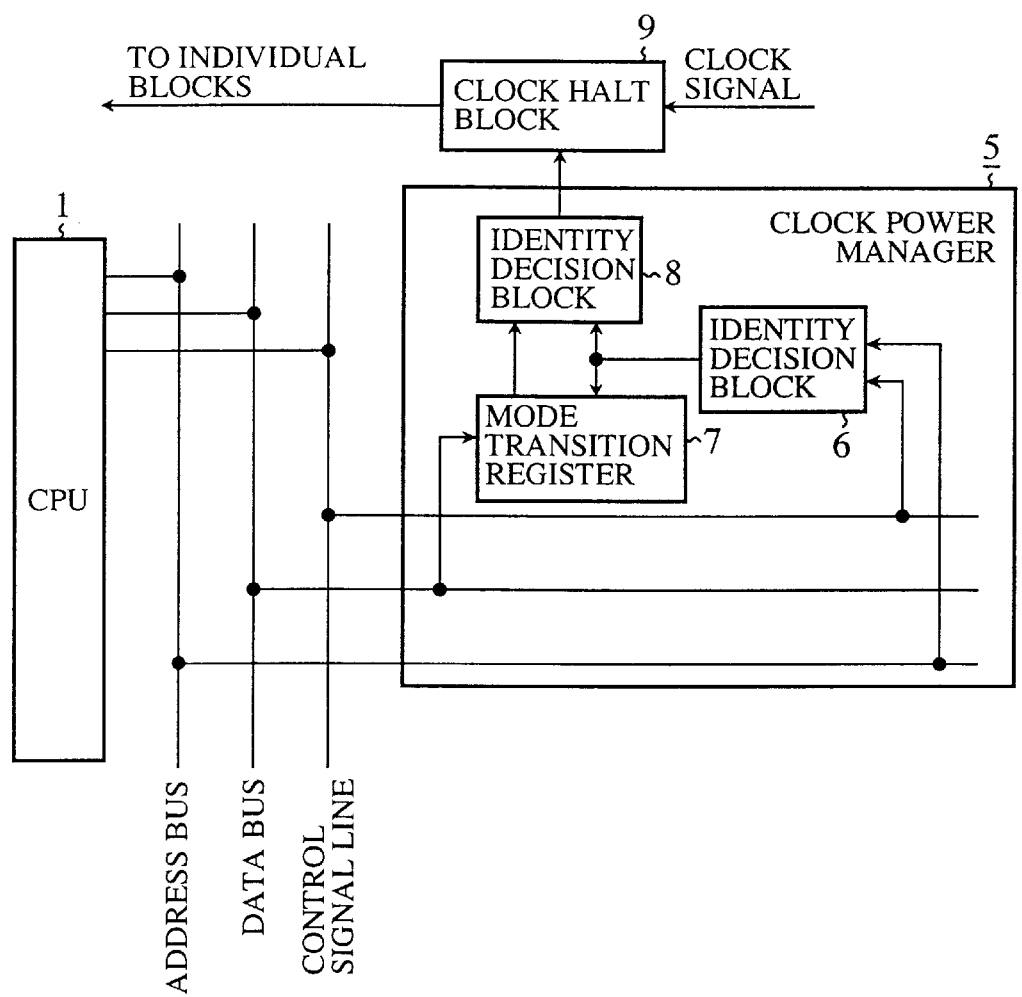
FIG. 18 is a block diagram showing a configuration of a clock power manager.

More specifically, assume that the operation of the CPU 11 involved in executing an instruction is partitioned into the following four phases, for example: an instruction fetch phase IF that fetches an instruction from a program in the memory 2 (see, FIG. 17); an instruction decode phase ID that decodes the instruction; an execute phase EX that performs that instruction; and a write back phase WB that writes an execution result back to the memory 2 or the like. In that case, when the instruction 1 is in the write back phase WB, for example, the instruction 2 next to the instruction 1 is in the execute phase EX, and the instruction 3 next to the instruction 2 is in the instruction decode phase ID.

Now, the case will be described where the CPU 11 executes the clock supply stop instruction.

First, fetching the instruction from the program in the memory 2 in the instruction fetch phase IF at step ST1, the CPU 11 decodes the instruction in the instruction decode phase ID, and recognizes that the instruction is the clock supply stop instruction at step ST2.

Subsequently, the CPU 11 supplies, in the execute phase EX, the address bus with the address of the identity decision block 13, and the control signal line with a read enable signal at step ST3.

In response to the address placed on the address bus by the CPU 11, the identity decision block 13 decides, in the execute phase EX, whether or not the address on the address bus agrees with the self-address of the identity decision block 13 at step ST4, and outputs, if they agree, the clock stop signal at step ST5 in response to the read enable signal supplied from the CPU 11.

Figure 2:
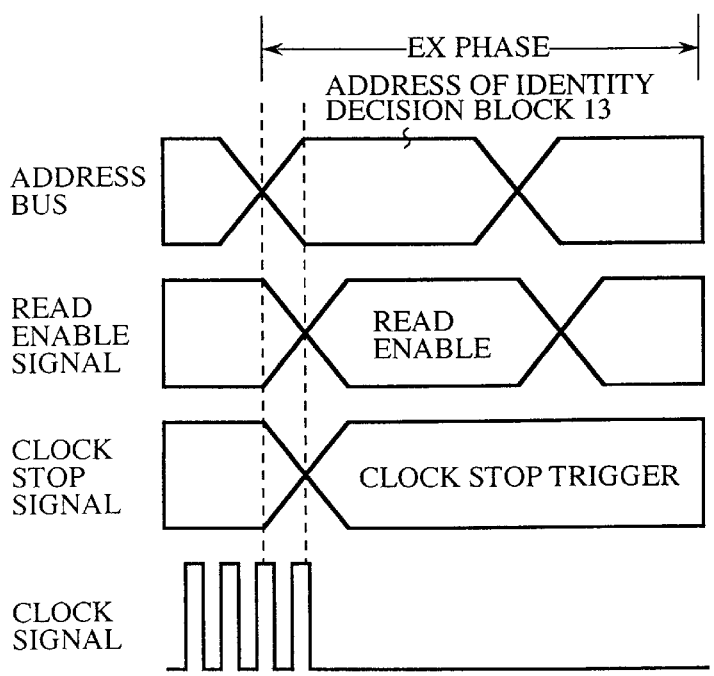
FIG. 2 is a timing chart illustrating waveforms of various signals in the embodiment 1.
Figure 3:
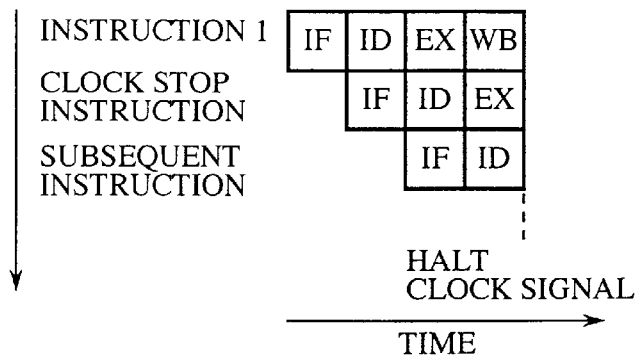
FIG. 3 is a state transition diagram illustrating the phase transition while the clock stop instruction is being executed.

Receiving the clock stop signal from the identity decision block 13, the clock halt block 14 suspends the supply of the clock signal to the respective blocks at step ST6, which causes these blocks such as the CPU 11, memory 2, peripheral equipment 3 and 4 to halt their operations (see, FIGS. 2 and 3).

As described above, the present embodiment 1 is configured such that the clock stop signal is output at the instant when it is decided that the address output from the CPU 11 in the execute phase coincides with the self-address of the identity decision block 13. This enables the clock stop signal to be output before the clock stop instruction shifts to the write back phase WB, which offers an advantage of being able to halt the supply of the clock signal before the CPU 11 executes the instruction next to the clock stop instruction.

Incidentally, it is sufficient for the CPU 11 to output the address of the identity decision block 13 and the read enable signal, which is equivalent to reading data from a memory or register. Thus, the conventional CPU can be applied without any modification in hardware.

Embodiment 2

Figure 5:
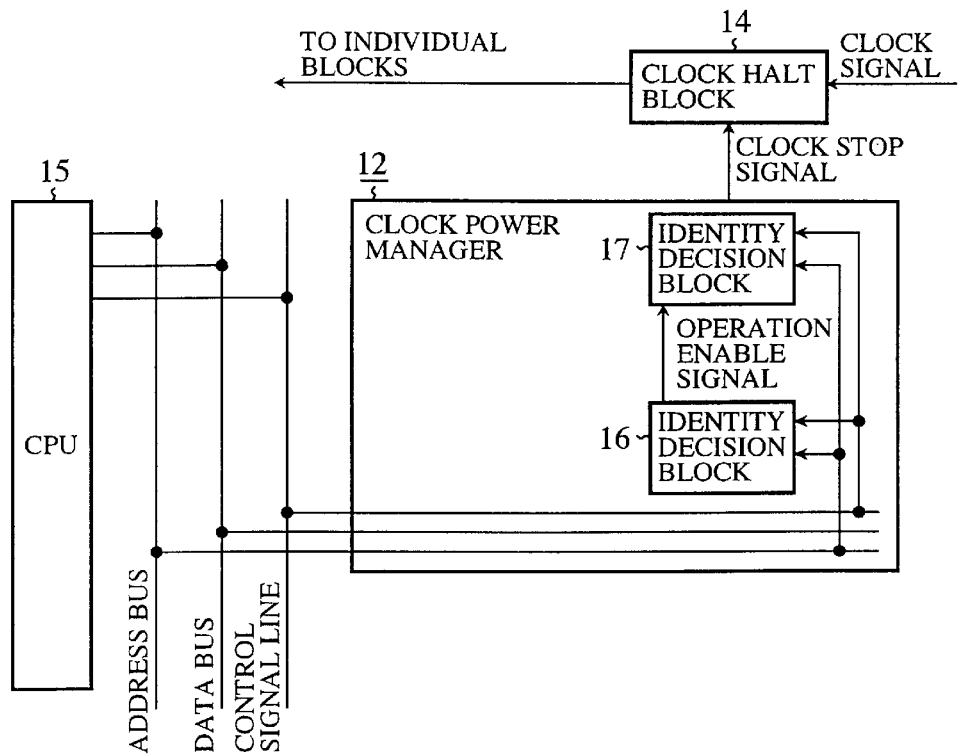
FIG. 5 is a block diagram showing a configuration of an embodiment 2 of a data processing system in accordance with the present invention.

FIG. 5 is a block diagram showing a configuration of an embodiment 2 of the data processing system in accordance with the present invention, in which the same reference numerals designate the same or like portions to those of FIG. 1, and hence the description thereof is omitted here.

In FIG. 5, the reference numeral 15 designates a CPU which implements the pipeline processing that decodes the subsequent instruction while executing the current instruction, and which supplies, when executing the clock stop instruction, the address bus with the addresses of identity decision blocks 16 and 17 in sequence; 16 designates the identity decision block (enable signal generating means) that outputs the operation enable signal when a first address placed on the address bus by the CPU 15 agrees with the self-address of the identity decision block 16; and 17 designates the identity decision block (stop signal generating means) that outputs the clock stop signal, if the second address placed on the address bus by the CPU 15 agrees with the self-address of the identity decision block 17 when the identity decision block 17 receives the operation enable signal from the identity decision block 16.

Figure 7:
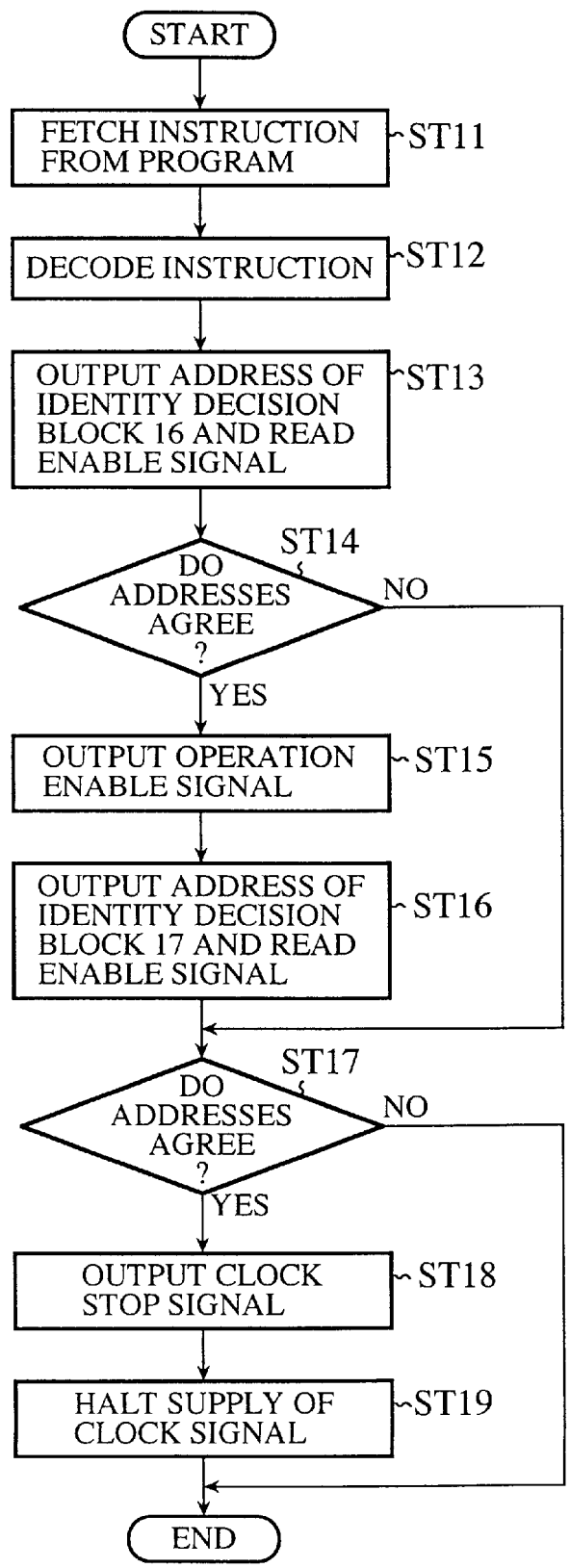
FIG. 7 is a flowchart illustrating a processing in the embodiment 2.

Next, the operation of the embodiment 2 will be described with reference to the flowchart of FIG. 7 illustrating the data processing method in the present embodiment 2.

First, fetching the instruction from the program in the memory 2 in the instruction fetch phase IF at step ST11, the CPU 15 decodes the instruction in the instruction decode phase ID, and recognizes that the instruction is the clock supply stop instruction at step ST12.

Subsequently, the CPU 15 supplies, in the execute phase EX, the address bus with the address of the identity decision block 16, and the control signal line with a read enable signal at step ST13.

In response to the address placed on the address bus by the CPU 15, the identity decision block 16 decides, in the execute phase EX, whether or not the address on the address bus agrees with the self-address of the identity decision block 16 at step ST14, and outputs, if they agree, the operation enable signal at step ST15 in response to the read enable signal supplied from the CPU 11.

Having supplied the address bus with the address of the identity decision block 16, the CPU 15 supplies, in the execute phase EX, the address bus with the address of the identity decision block 17, and the control signal line with the read enable signal at step ST16.

Receiving the address placed on the address bus by the CPU 15, the identity decision block 17 decides, in the execute phase EX, whether the address on the address bus agrees with the self-address of the identity decision block 17 at step ST17, and supplies, if they agree, the clock halt block 14 with the clock stop signal at step ST18, when the identity decision block 17 receives from the CPU 15 the read enable signal and from the identity decision block 16 the operation enable signal.

Figure 6:
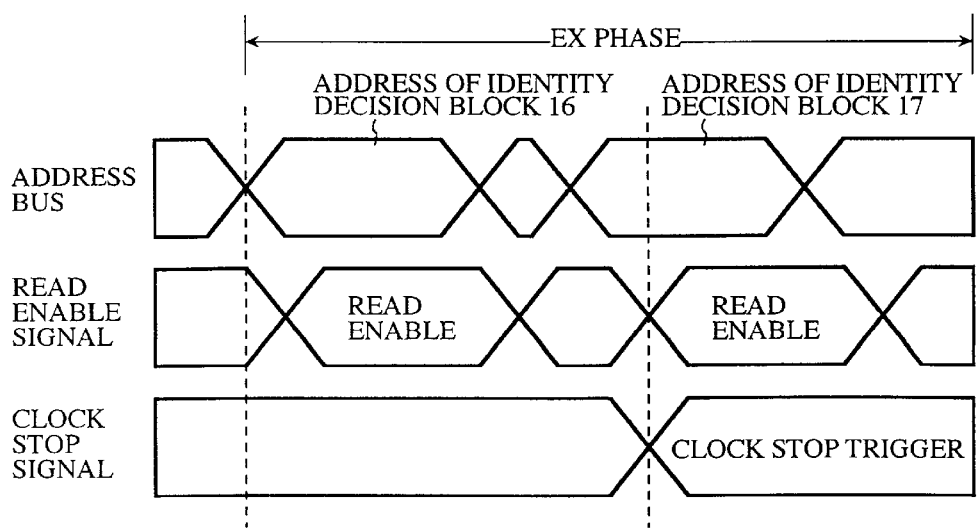
FIG. 6 is a timing chart illustrating waveforms of various signals in the embodiment 2.

Receiving the clock stop signal from the identity decision block 17, the clock halt block 14 halts the supply of the clock signal to the respective blocks at step ST19, which causes these blocks such as the CPU 15, memory 2, peripheral equipment 3 and 4 to halt their operations (see, FIG. 6)

As described above, the present embodiment 2 is configured such that when the CPU 15 sequentially supplies the address bus with the addresses in the execute phase, decisions are made as to whether the first address agrees with the self-address of the identity decision block 16, and the second address with the self-address of the identity decision block 17, and only if the two decisions are positive, the clock stop signal is output. This offers an advantage of being able to halt the supply of the clock signal before the CPU 15 executes the instruction next to the clock stop instruction, and to reduce the probability of erroneous operation because of the multiple time address comparisons.

Incidentally, it is sufficient for the CPU 15 to output the addresses of the identity decision blocks 16 and 17 and the read enable signal, which is equivalent to reading data from a memory or register. Thus, the conventional CPU can be applied without any modification in hardware.

Although the present embodiment 2 shows a case where the addresses of the identity decision blocks 16 and 17 are different, they may be identical.

Embodiment 3

Figure 8:
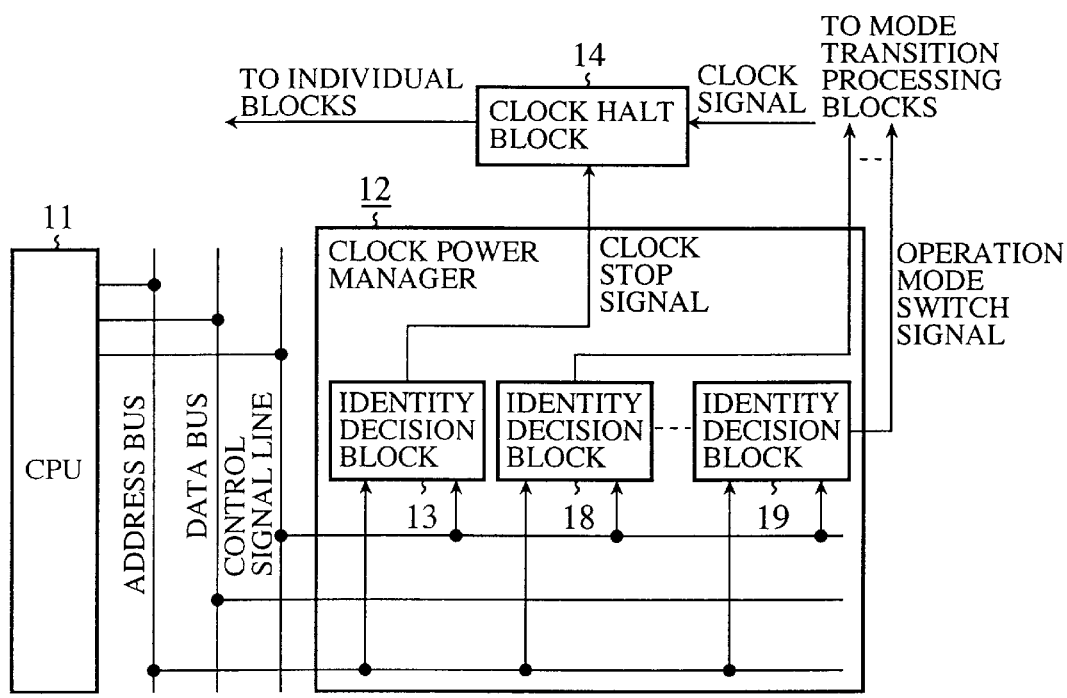
FIG. 8 is a block diagram showing a configuration of an embodiment 3 of a data processing system in accordance with the present invention.
Figure 9:
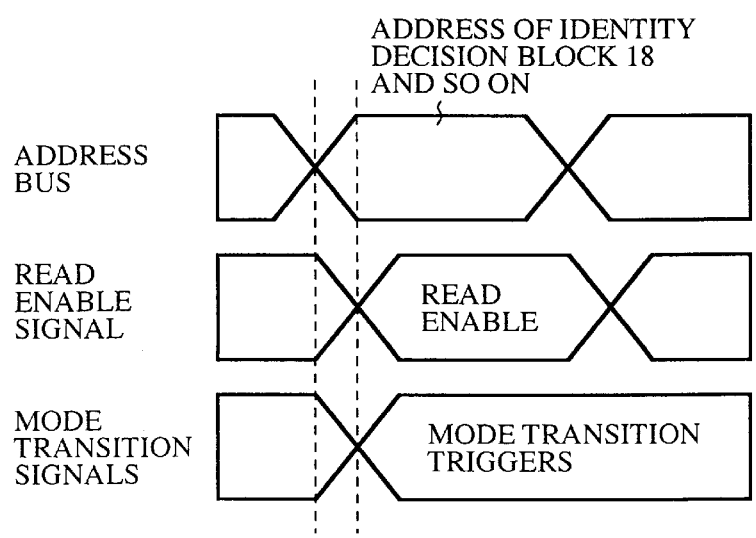
FIG. 9 is a timing chart illustrating waveforms of various signals in the embodiment 3.

Although the foregoing embodiments 1 and 2 handle the examples that halt the supply of the clock signal, an identity decision block 18 and/or an identity decision block 19 (mode switching means) can be added as shown in FIG. 8, each of which generates an operation mode switching signal that instructs a corresponding mode transition processing block not shown in FIG. 8 to change the operation mode when the address placed on the address bus by the CPU 11 agrees with the self-address of the identity decision block 18 or the identity decision block 19 (see, FIG. 9).

This offers an advantage of being able to change the operation mode into a particular mode that reduces the frequency of the clock signal, for example.

Embodiment 4

Figure 10:
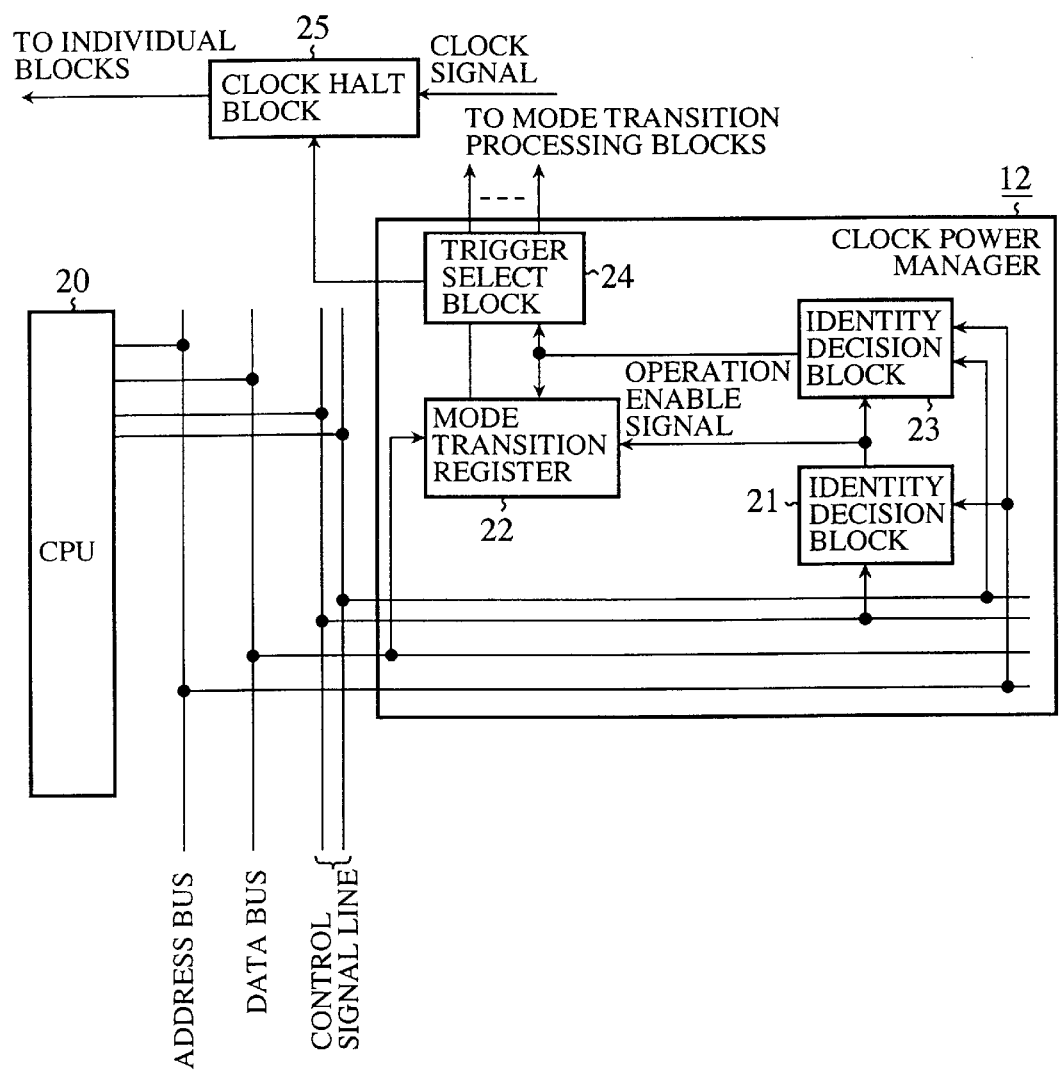
FIG. 10 is a block diagram showing a configuration of an embodiment 4 of a data processing system in accordance with the present invention.

FIG. 10 is a block diagram showing a configuration of an embodiment 4 of the data processing system in accordance with the present invention, in which the same reference numerals designate the same or like portions to those of FIG. 1, and hence the description thereof is omitted here.

In FIG. 10, the reference numeral 20 designates a CPU which implements the pipeline processing that decodes the subsequent instruction while executing the current instruction, and which supplies, when executing an operation mode switching instruction, the address bus with predetermined multiple addresses in sequence, and the data bus with data indicative of the operation mode after the mode switching; 21 designates the identity decision block (data storing means) that outputs an operation enable command for enabling data placed on the data bus by the CPU 20 to be written, if a first address placed on the address bus by the CPU 20 agrees with the self-address of the identity decision block 21; and 22 designates the mode transition register (register) that stores the data placed on the data bus by the CPU 20 in response to the operation enable command fed from the identity decision block 21.

The reference numeral 23 designates an identity decision block (transmitting means) that reads the data stored in mode transition register 22 and transmits the data to a trigger select block 24, if the second address placed on the address bus by the CPU 20 agrees with the self-address of the identity decision block 23; 24 designates the trigger select block (mode switching means) that outputs the operation mode switching signal corresponding to the data transmitted from the identity decision block 23; and 25 designates a clock halt block 25 (halting means) for suspending the supply of the clock signal to the individual blocks when the operation mode switching signal output from the trigger select block 24 instructs the halt of the supply of the clock signal.

Figure 12:
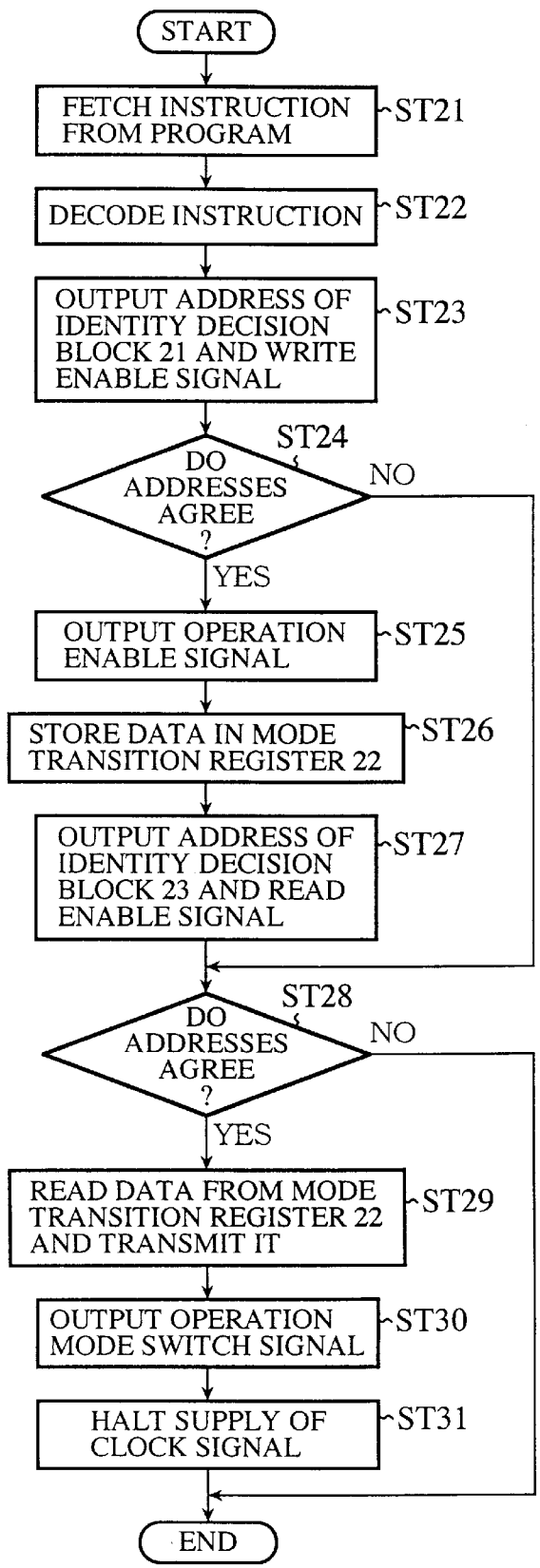
FIG. 12 is a flowchart illustrating a processing in the embodiment 4.

Next, the operation of the present embodiment 4 will be described with reference to the flowchart of FIG. 12 illustrating the data processing method in the present embodiment 4.

First, fetching the instruction from the program in the memory 2 in the instruction fetch phase IF at step ST21, the CPU 20 decodes the instruction in the instruction decode phase ID, and recognizes that the instruction is the operation mode switching instruction at step ST22.

Figure 11:
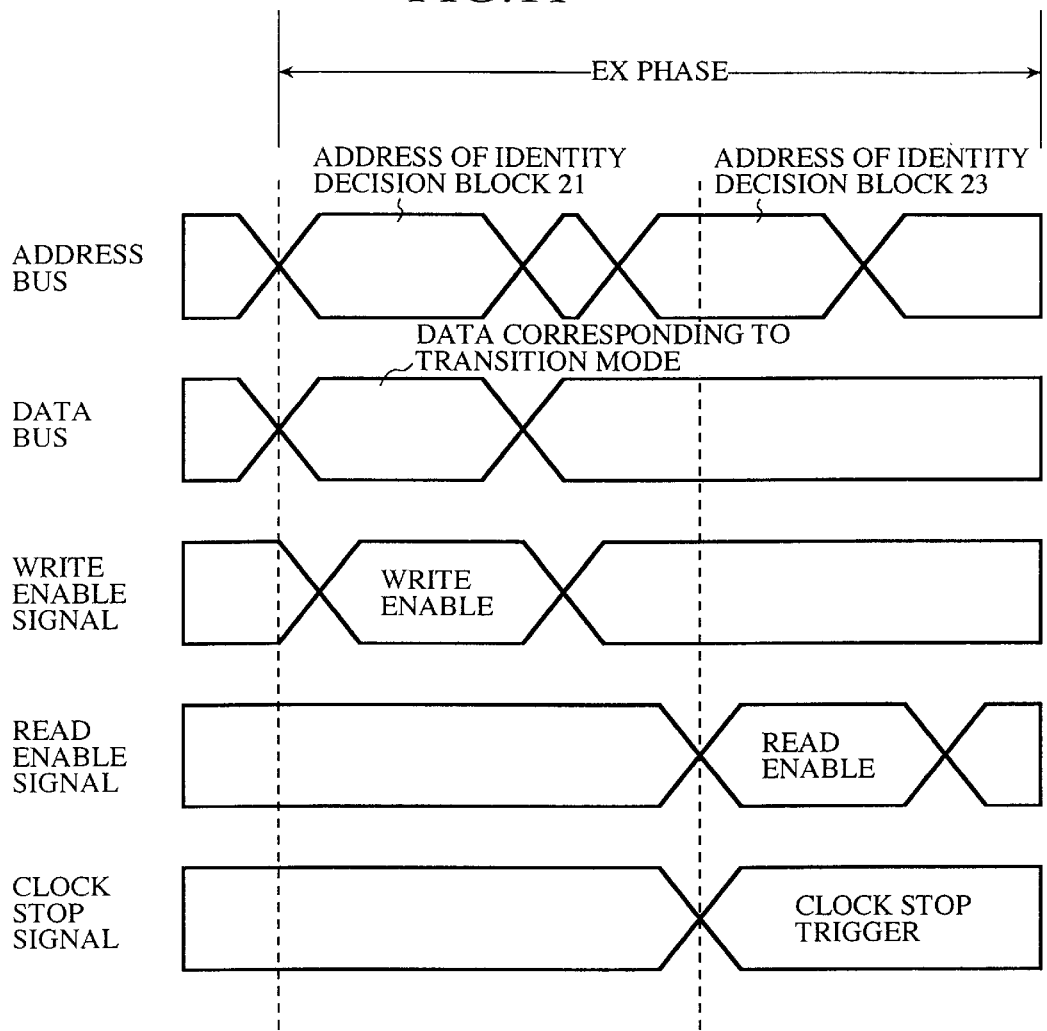
FIG. 11 is a timing chart illustrating waveforms of various signals in the embodiment 4.

Subsequently, the CPU 20 supplies, in the execute phase EX, the data bus with the data indicative of the operation mode after the mode change, the address bus with the address of the identity decision block 21, and the control signal line with a write enable signal at step ST23 as illustrated in FIG. 11.

In response to the address placed on the address bus by the CPU 20, the identity decision block 21 decides, in the execute phase EX, whether or not the address on the address bus agrees with the self-address of the identity decision block 21 at step ST24, and supplies, if they agree, the operation enable signal to the mode transition register 22 and identity decision block 23 at step ST25 in response to the write enable signal supplied from the CPU 20.

Receiving the operation enable signal from the identity decision block 21, the mode transition register 22 stores, in the execute phase EX, the data placed on the data bus by the CPU 20, at step ST26.

After having placed the address of the identity decision block 21 on the address bus, the CPU 20 then supplies the address bus with the address of the identity decision block 23, and the control signal line with the read enable signal at step ST27.

Receiving the address placed on the address bus the CPU 20, the identity decision block 23 decides, in the execute phase EX, whether the address on the address bus agrees with the self-address of the identity decision block 23 at step ST28, and reads, if they agree, the data stored in the mode transition register 22, and transmits the data to the trigger select block 24 at step ST29, if the identity decision block 23 receives from the CPU 20 the read enable signal, and from the identity decision block 21 the operation enable signal.

Receiving the data from the identity decision block 23, the trigger select block 24 outputs, in the execute phase EX, the operation mode switching signal corresponding to the data at step ST30.

Thus, the clock halt block 25 halts the supply of the clock signal to the respective blocks at step ST31, when the operation mode switching signal output from the trigger select block 24 instructs the halt of the supply of the clock signal, which causes these blocks such as the CPU 20, memory 2, peripheral equipment 3 and 4 to halt their operations (see, FIG. 11)

As described above, the present embodiment 4 is configured such that the mode transition register 22 stores, if the first address placed on the address bus by the CPU 20 agrees with the self-address of the identity decision block 21, the data placed on the data bus by the CPU 20, and that the trigger select block 24 outputs, if the second address placed on the address bus by the CPU 20 agrees with the self-address of the identity decision block 23, the operation mode switching signal corresponding to the data stored in the mode transition register 22. This offers an advantage of being able to halt, when the operation mode switching signal instructs to suspend the clock signal, the supply of the clock signal before the CPU 20 executes the instruction next to the clock stop instruction, and to reduce the probability of erroneous operation because of the multiple time address comparisons.

In addition, the present embodiment has another advantage of being able to change the mode into a special mode such as reducing the frequency of the clock signal, for example.

Embodiment 5

Figure 13:
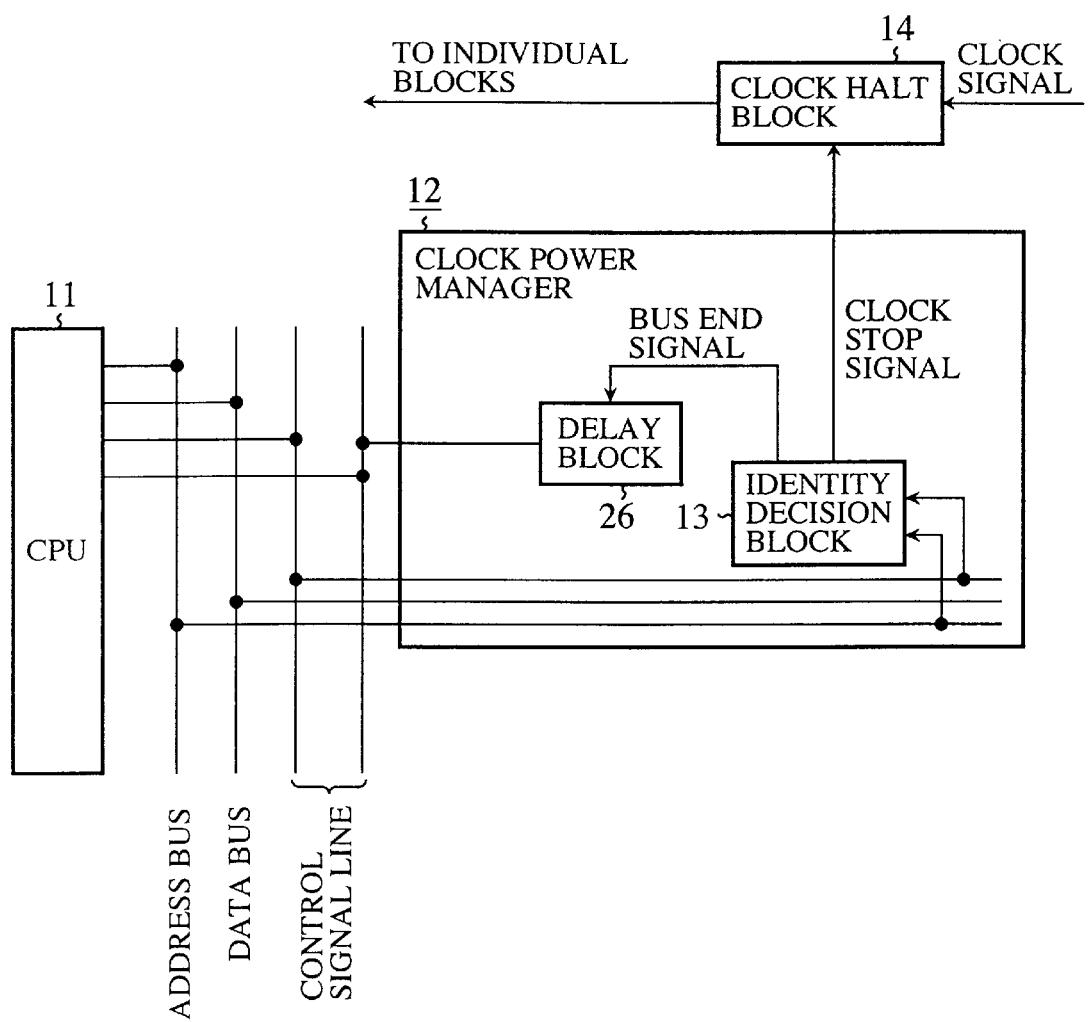
FIG. 13 is a block diagram showing a configuration of an embodiment 5 of a data processing system in accordance with the present invention.

FIG. 13 is a block diagram showing a configuration of an embodiment 5 of the data processing system in accordance with the present invention, in which the same reference numerals designate the same or like portions to those of FIG. 1, and hence the description thereof is omitted here.

In FIG. 13, the reference numeral 26 designates a delay block (delay means) for delaying a bus end signal that is output from the identity decision block 13 along with the clock stop signal.

Next, the operation of the present embodiment 5 will be described.

Figure 14:
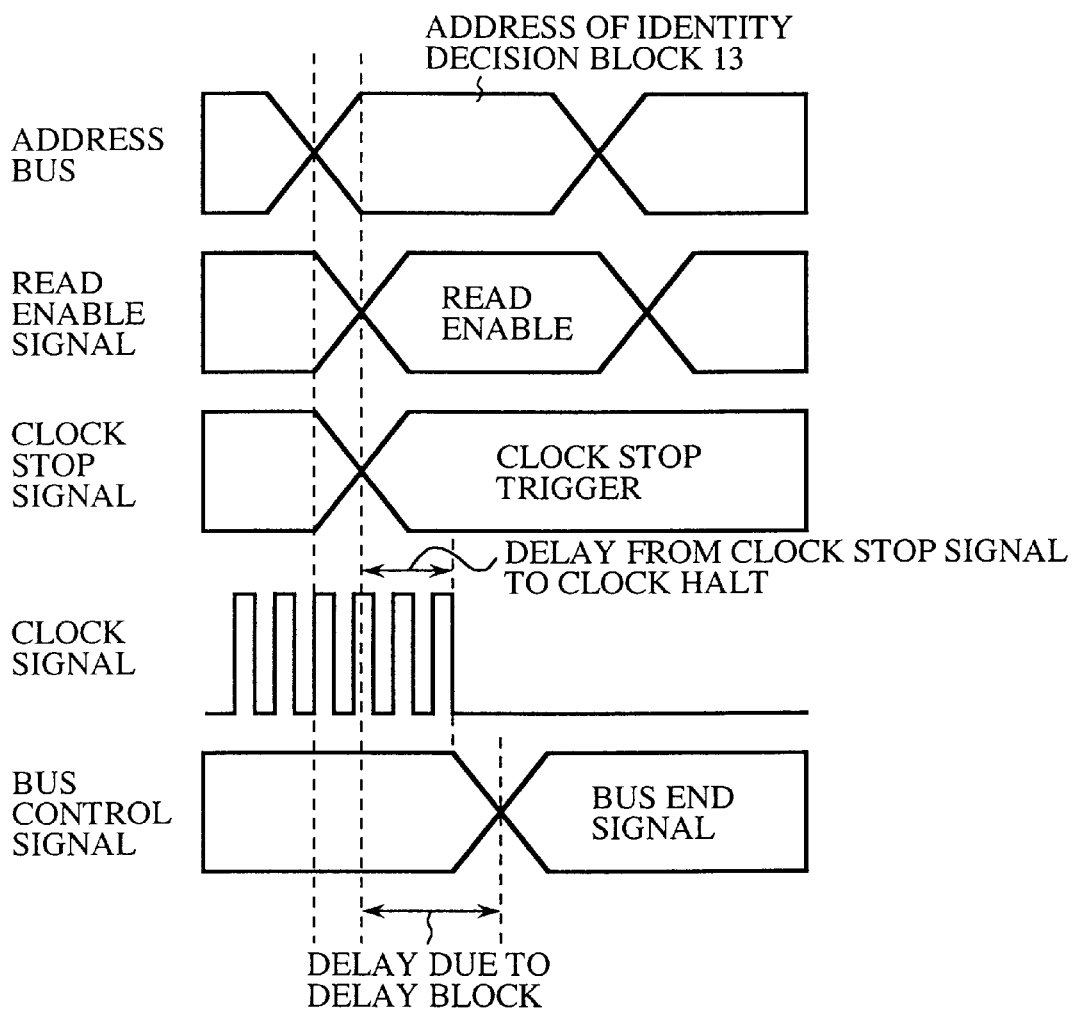
FIG. 14 is a timing chart illustrating waveforms of various signals in the embodiment 5.

Although the foregoing embodiments 1–3 explain the examples that halt the clock supply in response to the clock stop signal output from the identity decision block 13 or the like, it actually takes some amount of a time lag for the halt of the clock supply to takes place after the output of the clock stop signal as illustrated in FIG. 14. This will present a problem in that the CPU 11 can execute the instruction next to the clock stop instruction before the supply of the clock signal is actually suspended. This is because although the identity decision block 13 supplies, when it outputs the clock stop signal, the bus end signal to the control signal line to notify the CPU 11 of the completion of the output of the clock stop signal, if the CPU 11 receives the bus end signal before the supply of the clock signal has been actually halted, the CPU 11 can shift to the next phase, resulting in the problem described above.

In view of this, to positively eliminate the problem in that the CPU 11 can execute the instruction next to the clock stop instruction in the present embodiment 5, the delay block 26 delays by a fixed amount of time the bus end signal output from the identity decision block 13 to prevent the CPU 11 from receiving the bus end signal before the actual halt of the clock supply. It is obvious that the delay time of the delay block 26 must be sufficiently longer than the time lag mentioned above.

Thus, the present embodiment is configured such that the bus end signal output from the identity decision block 13 is delayed, which offers an advantage of being able to positively eliminate the problem in that the CPU 11 can execute the instruction next to the clock stop instruction.

Embodiment 6

Figure 15:
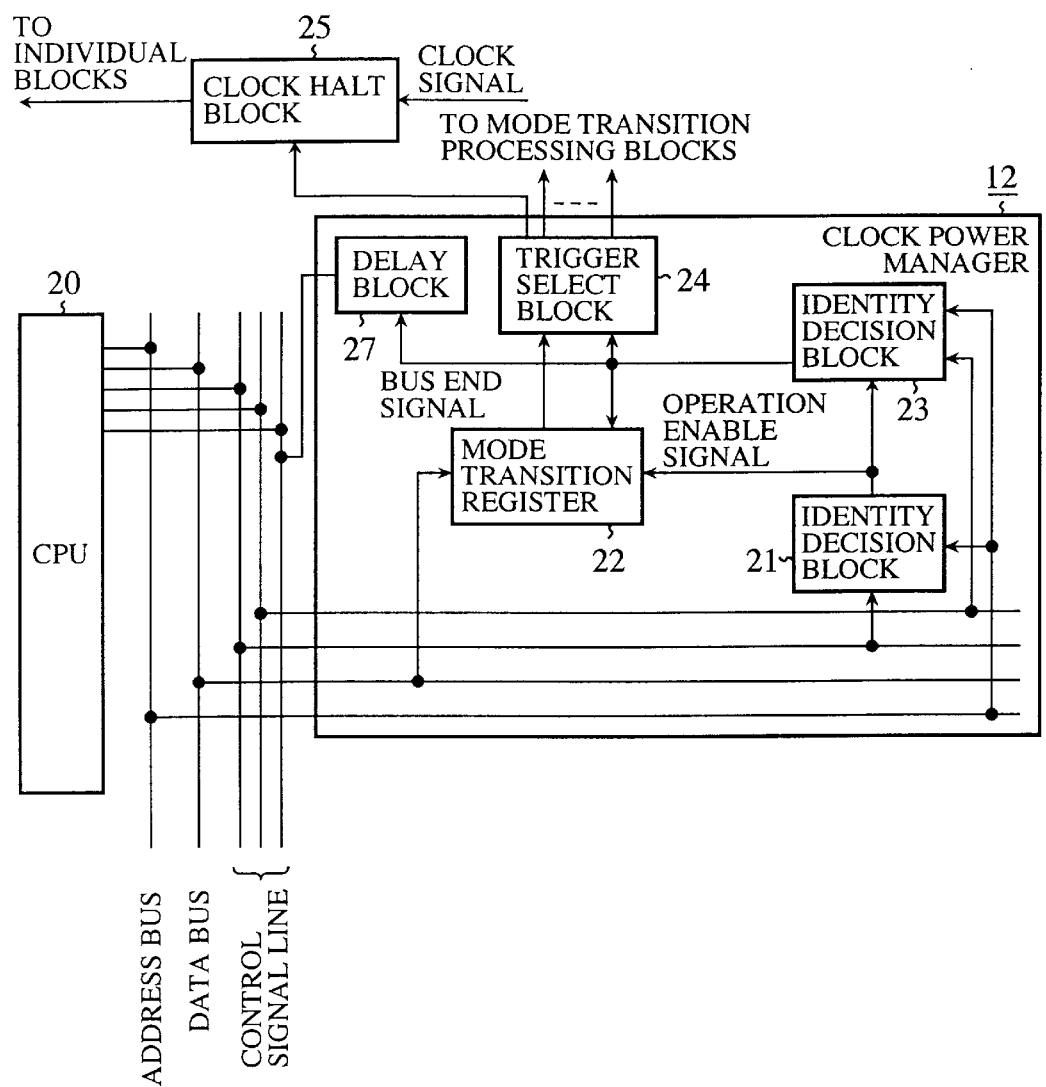
FIG. 15 is a block diagram showing a configuration of an embodiment 6 of a data processing system in accordance with the present invention.

FIG. 15 is a block diagram showing a configuration of an embodiment 6 of the data processing system in accordance with the present invention, in which the same reference numerals designate the same or like portions to those of FIG. 10, and hence the description thereof is omitted here.

In FIG. 15, the reference numeral 27 designates a delay block (delay means) for delaying a bus end signal output from the identity decision block 23, if the data, which is stored in the mode transition register 22 and is read therefrom by the identity decision block 23 to be sent to the trigger select block 24, instructs to halt the supply of the clock signal.

Next, the operation of the present embodiment 6 will be described.

Figure 16:
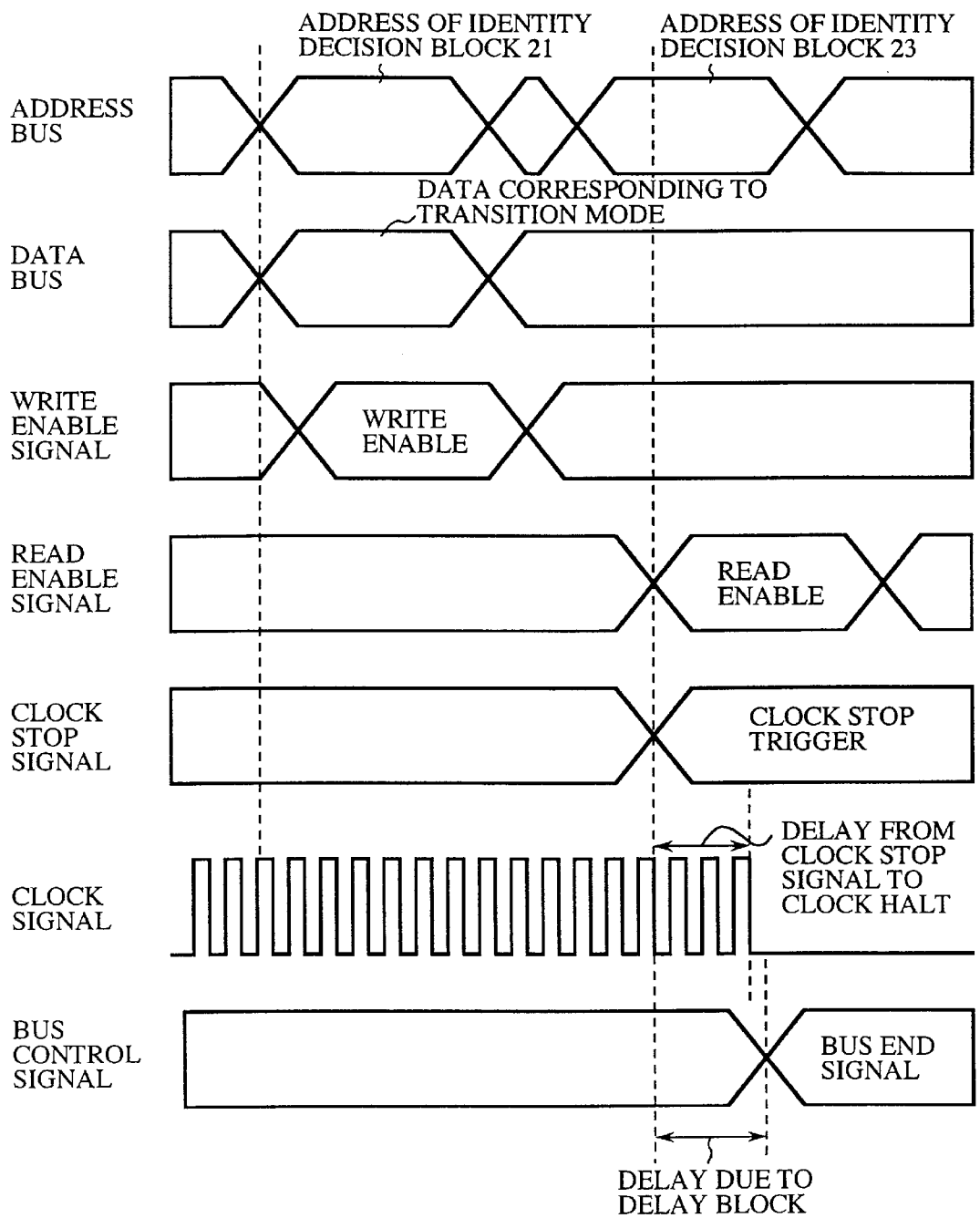
FIG. 16 is a timing chart illustrating waveforms of various signals in the embodiment 6.

Although the foregoing embodiment 4 explains the case in which the supply of the clock signal is suspended in response to the operation mode switching signal output from the trigger select block 24 to instruct the halt of the supply of the clock signal, it actually takes some amount of a time lag for halting the supply of the clock signal after the output of the operation mode switching signal as illustrated in FIG. 16. This presents a problem in that the CPU 20 can execute the instruction next to the clock stop instruction before the supply of the clock signal is actually suspended. This is because although the identity decision block 23 supplies, when it outputs the operation mode switching signal, the bus end signal to the control signal line to notify the CPU 20 of the completion of the output of the operation mode switching signal, if the CPU 20 receives the bus end signal before the supply of the clock signal is actually suspended, the CPU 20 shifts to the next phase, thereby resulting in that problem.

In view of this, to positively eliminate the problem in that the CPU 20 can execute the instruction next to the clock stop instruction in the present embodiment 6, the delay block 27 delays by a fixed amount of time the bus end signal output from the identity decision block 23 to prevent the CPU 20 from receiving the bus end signal before the actual halt of the clock supply. It is obvious that the delay time of the delay block 27 must be sufficiently longer than the time lag mentioned above.

Thus, the present embodiment 6 is configured such that the bus end signal output from the identity decision block 23 is delayed, which offers an advantage of being able to positively eliminate the problem in that the CPU 20 can execute the instruction next to the clock stop instruction.

What is claimed is:

1. A data processing system which executes pipeline processing that decodes a subsequent instruction in an execute phase of a current instruction in response to a clock signal, said data processing system comprising:

a CPU that supplies an address bus with at least one predetermined address in an execute phase of an operation mode switching instruction; and mode management means for producing an operation mode switching signal if the predetermined address placed on said address bus by said CPU agrees with a self-address assigned to said management means in advance, wherein the generation of the operation mode switching signal causes the operation mode to switch before the subsequent instruction in the pipeline is executed.

2. The data processing system as claimed in claim 1, further comprising halt means for suspending supply of the clock signal in response to a clock stop signal for halting supply of the clock signal, wherein said CPU executes a clock stop instruction as the operation mode switching instruction, and supplies, in an execute phase of said clock stop instruction, said address bus with the predetermined address, and wherein said mode management means comprises stop signal generating means for generating the clock stop signal as the operation mode switching signal if the predetermined address placed on the address bus by said CPU agrees with a self-address assigned in advance to said stop signal generating means as the self-address of said mode management means.

3. The data processing system as claimed in claim 1, further comprising halt means for suspending supply of the clock signal in response to a clock stop signal for halting supply of the clock signal, wherein said CPU executes a clock stop instruction as the operation mode switching instruction, and supplies, in an execute phase of said clock stop instruction, said address bus with a plurality of predetermined addresses in sequence, and wherein said mode management means comprises:

enable signal generating means for generating, in the execute phase of said clock stop instruction, an operation enable signal if a first address of said predetermined addresses agrees with a self-address assigned to said enable signal generating means in advance; and stop signal generating means for generating, in the execute phase of said clock stop instruction, the clock stop signal as the operation mode switching signal in response to the operation enable signal if a second address of said predetermined addresses agrees with a self-address assigned to said stop signal generating means in advance as the self-address of said mode management means.

4. The data processing system as claimed in claim 1, wherein said CPU executes a clock stop instruction as the operation mode switching instruction, and supplies, in an execute phase of said clock stop instruction, said address bus with a plurality of predetermined addresses in sequence, wherein said management means comprises stop signal generating means for generating a clock stop signal for halting supply of the clock signal, if one of said plurality of predetermined addresses placed on said address bus by said CPU agrees with a self-address assigned to said stop signal generating means in advance, and wherein said data processing system further comprises halt means for suspending supply of said clock signal in response to said clock stop signal.

5. The data processing system as claimed in claim 1, wherein said CPU supplies, in the execute phase of the operation mode switching instruction, said address bus with a plurality of predetermined addresses in sequence, and a data bus with data indicative of an operation mode after mode switching, and wherein said mode management means comprises:

storing means for storing in a register the data placed on said data bus by said CPU, if a first address of said plurality of predetermined addresses placed on said address bus by said CPU agrees with a self-address assigned to said storing means;

transfer means for reading the data stored in said register, and for sending the data if a second address of said plurality of predetermined addresses placed on said address bus by said CPU agrees with a self-address assigned to said transfer means; and mode switching means for producing said operation mode switching signal corresponding to said data sent from said transfer means.

6. The data processing system as claimed in claim 5, further comprising halt means for suspending the clock signal in response to the operation mode switching signal output from said mode switching means, if the operation mode switching signal instructs halt of the supply of the clock signal.

7. The data processing system as claimed in claim 2, further comprising delay means for delaying a bus end signal supplied from said stop signal generating means to said CPU to notify said CPU of a completion of the clock stop signal.

8. The data processing system as claimed in claim 3, further comprising delay means for delaying a bus end signal supplied from said stop signal generating means to said CPU to notify said CPU of a completion of the clock stop signal.

9. The data processing system as claimed in claim 6, further comprising delay means for delaying a bus end signal supplied from said transfer means to said CPU to notify said CPU of a completion of the operation mode switching signal, if said mode switching means outputs the operation mode switching signal instructing halt of supply of the clock signal.

10. A data processing method which executes pipeline processing that decodes a subsequent instruction in an execute phase of a current instruction in response to a clock signal, said data processing method comprising the steps of:

(a) supplying, in an execute phase of an operation mode switching instruction, an address, wherein the generation of the operation mode switching signal causes the operation mode to switch before the subsequent instruction in the pipeline is executed bus with at least one predetermined address; and (b) producing an operation mode switching signal if the predetermined address placed on said address bus agrees with a preset address.

11. The data processing method as claimed in claim 10, wherein the step (a) executes a clock stop instruction as the operation mode switching instruction, and supplies, in an execute phase of said clock stop instruction, said address bus with the predetermined address, wherein the step (b) generates a clock stop signal for halting supply of the clock signal, as the operation mode switching signal, if the predetermined address placed on the address bus agrees with the preset address, and wherein said data processing method further comprising the step of suspending supply of the clock signal in response to the clock stop signal.

12. The data processing method as claimed in claim 10, wherein the step (a) executes a clock stop instruction as the operation mode switching instruction, and supplies, in an execute phase of said clock stop instruction, said address bus with a plurality of predetermined addresses in sequence, wherein the step (b) decides, in the execute phase of said clock stop instruction, whether a first address of said predetermined addresses agrees with a first preset address, and whether a second address of said predetermined addresses agrees with a second preset address, and generates, if both decisions are positive, a clock stop signal to halt supply of the clock signal in response to the clock stop signal.

13. The data processing method as claimed in claim 10, wherein the step (a) executes a clock stop instruction as the operation mode switching instruction, and supplies, in an execute phase of said clock stop instruction, said address bus with a plurality of predetermined addresses in sequence, wherein the step (b) generates a clock stop signal for halting supply of the clock signal, if one of said plurality of predetermined addresses placed on said address bus agrees with a preset address, and wherein said data processing method further comprises the step of suspending supply of said clock signal in response to said clock stop signal.

14. The data processing method as claimed in claim 10, wherein the step (a) supplies, in the execute phase of the operation mode switching instruction, said address bus with a plurality of predetermined addresses in sequence, and a data bus with data indicative of an operation mode after mode switching, and wherein the step (b) comprises the substeps of:
storing in a register the data placed on said data bus, if a first address of said plurality of predetermined addresses placed on said address bus agrees with a first preset address; and
producing said operation mode switching signal corresponding to said data stored in said register, if a second address of said plurality of predetermined addresses placed on said address bus agrees with a second preset address.

15. The data processing method as claimed in claim 14, further comprising the step of suspending the clock signal in response to the operation mode switching signal, if the operation mode switching signal instructs halt of the supply of the clock signal.

16. The data processing method as claimed in claim 11, further comprising the step of delaying a bus end signal which notifies that the clock stop signal is completed.

17. The data processing method as claimed in claim 12, further comprising the step of delaying a bus end signal which notifies that the clock stop signal is completed.

18. The data processing method as claimed in claim 14, further comprising the step of delaying a bus end signal which notifies that the operation mode switching signal is completed, if the operation mode switching signal is output which instructs halt of supply of the clock signal.

* * * * *